Sept. 5, 1944. O. H. PADDOCK 2,357,538
PROCESS AND APPARATUS FOR THE MANUFACTURE OF LAMINATED SAFETY GLASS
Filed June 25, 1941 2 Sheets-Sheet 1
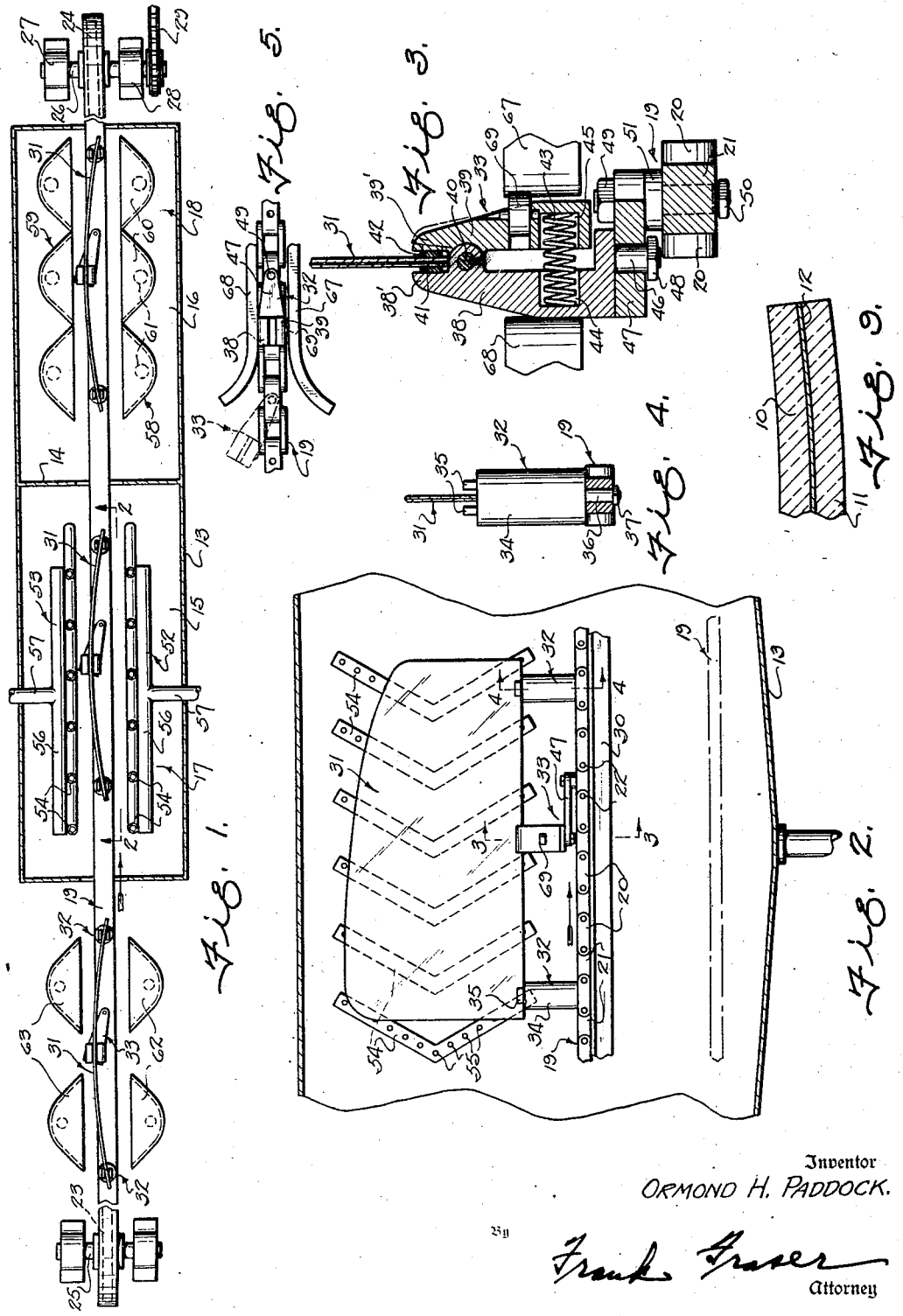
Inventor
ORMOND H. PADDOCK.
By Frank Fraser
Attorney Inventor
ORMOND H. PADDOCK.

By Frank Fraser
Attorney

Patented Sept. 5, 1944

2,357,538

UNITED STATES PATENT OFFICE 2,357,538

PROCESS AND APPARATUS FOR THE MANUFACTURE OF LAMINATED SAFETY GLASS

Ormond H. Paddock, Rossford, Ohio, assignor to Libbey-Owens-Ford Glass Company, Toledo, Ohio, a corporation of Ohio Application June 25, 1941, Serial No. 399,638

15 Claims. (Cl. 154—2.70)

The present invention relates broadly to the manufacture of laminated safety glass, and more particularly to an improved process and apparatus for producing bent or curved sheets of laminated safety glass.

Briefly stated, laminated safety glass comprises two or more sheets of glass having one or more sheets of a suitable plastic strengthening material interposed therebetween and bonded thereto to provide a composite structure. According to one process, the glass sheets and interposed sheet of strengthening material are assembled in proper superimposed relation to form a "sandwich," and this sandwich is then submerged unprotected in a bath of fluid contained in an autoclave and there subjected to the combined action of heat and pressure; the said fluid coming into direct contact with the sandwich to effect a uniform application of heat and pressure throughout from all sides thereof, whereby to cause a bonding together of the several laminations to produce a composite structure. In such process, however, it has been found desirable that the sandwich, before being placed within the fluid bath, be subjected at least to a relatively light initial or preliminary pressing sufficient to expel any air, noncondensable gases, etc., from between the several laminations and to cause said laminations to stick together to facilitate the subsequent handling thereof as well as to prevent the pressing fluid from creeping in between the laminations when said sandwich is placed in the autoclave.

Heretofore, it has been customary to prepress flat sheets of laminated safety glass before being placed in the autoclave by passing them between one or a plurality of pairs of rolls of a suitable resilient compressible material such as rubber. While this method of prepressing has been found entirely satisfactory when used in the treatment of flat sheets of laminated safety glass, it is not entirely satisfactory in the prepressing of bent or curved sheets; particularly, because of the increased handling of the glass, increased time required for the prepressing operation, and increased liability of breakage.

The aim and principal object of the present invention lies in the provision of a novel process and apparatus for treating laminated safety glass "sandwiches" in a manner to effect the desired initial or preliminary pressing thereof prior to being placed in the autoclave and which are of especial utility in the prepressing of bent or curved sheets of laminated safety glass.

Another object of the invention is the provision of such a process and apparatus wherein the initial or preliminary pressing of bent or curved laminated safety glass sandwiches may be accomplished rapidly and conveniently and in a substantially continuous manner to the end that the labor involved in such operation will be less and the time required in the performance thereof reduced.

A further object of the invention is to provide such a process and apparatus wherein the prepressing of the bent or curved laminated safety glass sandwiches can be effected as said sandwiches are carried forwardly in a substantially vertical position without placing any strain upon the glass sheets to the end that the liability of breakage thereof will be reduced to a minimum; the supporting means for the sandwiches being so constructed as to present substantially no interference to the prepressing of the several component parts of the laminated sheets.

A further object of the invention is to provide such a process and apparatus wherein the component parts of the bent or curved laminated sheets are caused to adhere initially to one another by impinging thereupon jets or sprays of a heated fluid such as a low melting point alloy under pressure and which process and apparatus, while particularly adapted for the prepressing operation, may under certain conditions be utilized for the final compositing operation.

Other objects and advantages of the invention will become more apparent during the course of the following description, when taken in connection with the accompanying drawings.

In the drawings, wherein like numerals are employed to designate like parts throughout the same:

Fig. 1 is a longitudinal horizontal sectional view of one form of apparatus which may be employed for carrying out the present invention;

Fig. 2 is a vertical longitudinal sectional view through a portion of the apparatus taken substantially on line 2—2 of Fig. 1;

Fig. 3 is a detail vertical sectional view through one of the clamp members for clampingly supporting the laminated sandwich taken substantially on line 3—3 of Fig. 2;

Fig. 4 is a detail vertical sectional view through one of the supporting members also employed for supporting the laminated sandwich taken substantially on line 4—4 of Fig. 2;

Fig. 5 is a plan view of a portion of the apparatus;

Fig. 9 is a fragmentary sectional view of a portion of a bent or curved sheet of laminated safety glass.

Figure 6:
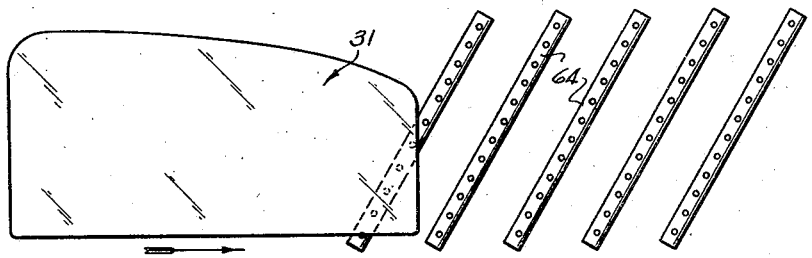
Figs. 6, 7 and 8 are diagrammatic views illustrating different arrangements of the fluid spray pipes for directing the pressing fluid upon the sandwiches.

With reference now to the drawings, there is illustrated in Fig. 9 a bent or curved sheet of laminated safety glass comprising the two sheets of glass 10 and 11, between which is interposed a sheet or layer of plastic strengthening material 12 bonded to the glass sheets to provide a composite structure. Any desired kind of material may be used for the strengthening interlayer, and therefore the invention is not limited to the use of any particular material. On the contrary, this invention concerns more especially the handling of the laminations after they have been treated in the desired manner and arranged in proper assembled relationship to form a sandwich. However, it is preferred that the strengthening material or reinforcing interlayer be of a synthetic resin such as a vinyl acetal.

In accordance with the present invention, the apparatus herein provided for effecting the initial or preliminary pressing of the several laminations includes a relatively long tunnel-type housing 13, the interior of which is divided intermediate its ends by a transverse partition wall 14 into a pair of separate compartments or chambers 15 and 16. Arranged within the compartment 15 is the pressing apparatus designated in its entirety by the numeral 17, while arranged within the compartment 16 is the heating means generally indicated by the numeral 18 for removing any of the pressing fluid which may adhere to the glass sheets.

Extending longitudinally through the housing 13 is a horizontal endless conveyor 19, preferably in the form of a sprocket chain composed of the overlapping and interlocking links 20 and 21 pivotally connected together by the pintles 22. The sprocket chain is trained at the opposite ends of its loop about sprockets 23 and 24 mounted upon horizontal shafts 25 and 26, each being journaled in spaced bearings 27 and 28. One of the sprockets, and as here shown sprocket 24, is positively driven by a suitable chain and sprocket drive or the like 29. The upper horizontal run or flight of the sprocket chain is supported upon and slides along a longitudinally extending stationary rail 30 which prevents sagging of said upper run or flight as it moves forwardly.

The bent or curved laminated safety glass sandwiches to be pressed are designated by the numeral 31 and, as shown, these sandwiches are supported on edge in a vertical position upon the endless conveyor 19 and are carried thereby first through the compartment 15 of the housing 13, wherein they are subjected to high velocity jets or sprays of a pressing fluid, preferably a low melting point alloy, and then through the heating compartment 16.

Although the invention is not restricted to any particular means for supporting the sandwiches 31 during the prepressing operation, each sandwich is herein shown as being freely supported on edge adjacent its opposite ends and clampingly supported intermediate its ends by the cooperating supporting members 32 and clamp member 33. Each of the supporting members 32 may consist, as shown in Fig. 4, of a vertical cylindrical post 34 provided at its upper end with spaced lips 35 for receiving the sandwich 31 therebetween and at its lower end with a depending bolt 36 rotatably carried by the endless conveyor 19 and secured thereto by a nut or the like 37. In this way, the supporting members 32 are swiveled upon the endless conveyor so that they may be rotated to assume various positions for supporting sandwiches of different curvatures.

The clamp member 33 comprises a vertical stationary jaw 38 and a complemental movable jaw 39 which is pivotally associated with said stationary jaw and mounted upon a horizontal pin 40 carried thereby adjacent its upper end. The laminated glass sandwich 31 is clamped between the upper end portions 38' and 39' of the fixed and movable jaws 38 and 39, as shown in Fig. 3, and preferably secured to the inner faces of the clamping portions 38' and 39' of said jaws are pads 41 and 42 respectively of felt, rubber, or other suitable cushioning material which will not mar or scratch the glass surfaces. The upper end 39' of movable jaw 39 is normally urged toward the upper end 38' of stationary jaw 38 to maintain them in glass clamping relation by means of an expansion spring 43 disposed between the jaws adjacent the lower ends thereof and received within recesses 44 and 45 formed in said jaws 38 and 39 respectively.

The stationary jaw 38 of clamp member 33 has secured to the bottom thereof a vertical bolt 46 which passes loosely through an opening in the outer end of a horizontal arm 47 and is secured thereto by a nut 48. In this way, the stationary and movable jaws 38 and 39 are permitted to freely rotate or swivel with respect to the arm 47. The horizontal arm 47 is also swiveled at its inner end upon the upper end of a vertical bolt 49 which passes downwardly through an opening in one of the links 21 of endless conveyor 19 and is secured thereto by a nut 50. The horizontal arm 47 is suitably spaced above the endless conveyor by a shim or washer 51 carried upon bolt 49.

The apparatus 17 for applying the initial or preliminary pressure to the sandwiches comprises a pair of spray units 52 and 53 arranged in the compartment 15 of housing 13 and disposed at opposite sides of the path of travel of said sandwiches. Each spray unit 52 and 53 comprises a plurality of spray pipes 54, each being formed in the shape of a V, with the base of the V pointing in a direction opposite to the direction of travel of the sandwiches and positioned substantially midway the upper and lower edges thereof. The spray pipes 54 are substantially parallel with one another and each is provided with a plurality of spray openings 55. All of the spray pipes of each unit are preferably secured to a header 56 connected by a conduit 57 with a suitable source of fluid supply.

As the safety glass sandwiches 31 pass between the spray units 52 and 53, high velocity jets or sprays of a pressing fluid are directed through the openings 55 in spray pipes 54 upon opposite sides of the sandwiches and the pressure exerted by the fluid will be sufficient to effect the desired initial or preliminary pressing operation and cause the laminations to adhere to one another throughout substantially their entire areas. Although the invention is not limited to any particular type of pressing fluid, it is preferred that a low melting point alloy be used for this purpose. One low melting point alloy which may be used comprises a mixture of 50% bismuth, 25% lead, 12½% tin, and 12½% cadmium. It is also preferred that the alloy be at a temperature of approximately 150 degrees F.

The purpose of forming the spray pipes 54 in the shape of a V, and in arranging them as shown in Fig. 2, is to effect an initial pressure upon the safety glass sandwiches at substantially the center thereof and then progressively toward the top and bottom edges as said sandwiches are carried forwardly so that any air, non-condensable gases, etc., trapped between the laminations will be forced upward and downward and expelled from between the upper and lower edges thereof.

After passing between the pressing units 52 and 53, the laminated glass sandwiches 31 move into and through compartment 16 between a pair of heating units 58 and 59, each consisting, as here shown, of a plurality of reflectors 60 and incandescent lamps 61. The compartment 16 is heated to a relatively higher temperature than the alloy used in the prepressing operation so as to remove any of the alloy which may adhere to the glass surfaces or to the glass supporting means.

If desired, suitable radiant heating units 62 and 63 may also be provided at opposite sides of the path of travel of the laminated glass sandwiches 31 forwardly of the housing 13 to effect a preheating of the glass sheets and plastic interlayer before they are subjected to the pressing fluid in compartment 15.

Figure 7:
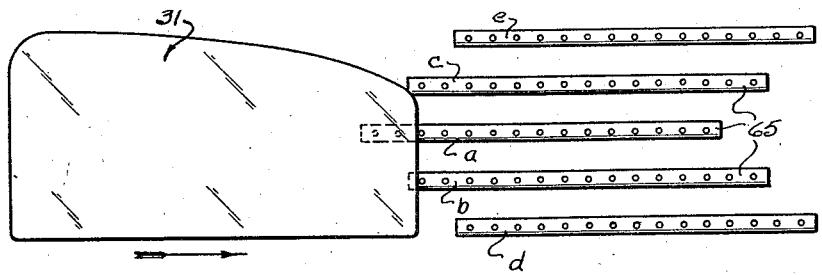
Figure 8:
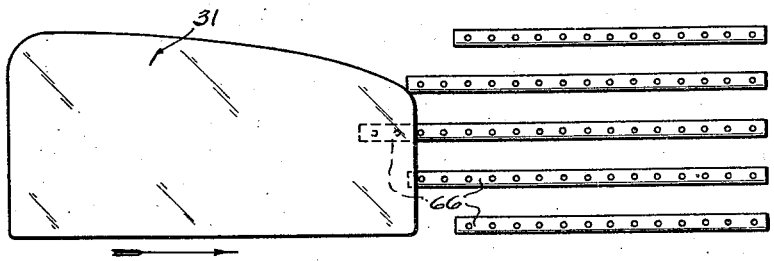

In Figs. 6, 7 and 8 are illustrated three different ways in which the spray pipes of the pressing units 52 and 53 can be arranged to apply the fluid pressure progressively to the laminated glass sandwiches 31 as they move forwardly to force any air, non-condensable gases, etc., from between the laminations. For instance, in Fig. 6, the spray pipes 64 are arranged diagonally so that the pressure is applied to the sandwich 31 beginning at the forward bottom corner thereof. On the other hand, in Fig. 7 the spray pipes 65 are arranged horizontally, with the middle pipe *a* projecting forwardly beyond the two adjacent pipes *b* and *c*, and the two latter pipes projecting forwardly beyond the outer pipes *d* and *e*. With this arrangement, the pressure is applied initially to the laminated glass sandwich intermediate the top and bottom edges thereof and then progressively toward said top and bottom edges. In Fig. 8 the spray pipes 66 are arranged substantially as shown in Fig. 7, with the exception that the rear ends thereof terminate in substantial alignment with one another, whereas in Fig. 7 the rear end of the middle pipe *a* terminates forwardly of the adjacent pipes *b* and *c*, while the latter pipes terminate forwardly of the rear ends of outer pipes *d* and *e*. With this arrangement, the pressure upon the sandwiches is also progressively relieved, whereas in Fig. 8 the pressure is relieved simultaneously across the entire width of the sandwiches.

In order to facilitate the positioning of the laminated glass sandwiches 31 upon the supporting and clamp members 32 and 33 and their subsequent removal therefrom, there may be provided at the forward or loading end of the apparatus and also at the opposite or unloading end thereof a pair of spaced horizontal cam rails 67 and 68 arranged parallel with respect to one another and between which the supporting and clamp members pass. The forward end portions of the cam rails can be curved outwardly away from one another as shown in Fig. 5 to guide the supporting and clamp members therebetween. Carried by the movable jaw 39 of each clamp member 33 is a freely rotatable roller 69 projecting slightly beyond said jaw and adapted to engage the cam rail 67. Thus, as the clamp member 33 passes between the cam rails 67 and 68, the roller 69 will be urged inwardly to move the upper end of the movable jaw away from the upper end of the stationary jaw as indicated by the broken lines in Fig. 3. The laminated glass sandwich can then be positioned between the upper ends of the jaws 38 and 39 by the operator and held in such position until the roller 69 passes beyond the cam rails, at which time the upper ends of the jaws will be automatically urged into glass clamping engagement by the spring 43. The operator can then release the laminated sandwich and it will be firmly clamped in place intermediate its ends and freely supported adjacent its opposite ends upon the supporting members 32.

From the above, it will be seen that with the apparatus herein provided handling of the bent or curved laminated glass sandwiches during the preliminary pressing thereof is reduced to a minimum, and that after the sandwiches have been prepressed in the manner herein disclosed they can be placed unprotected in an autoclave and subjected therein to the direct action of fluid under pressure to complete the compositing of the laminations. The apparatus is of relative simple construction and can be operated rapidly and conveniently to effect a thorough and efficient preliminary pressing of the sandwiches in a continuous manner. Furthermore, because the supporting and clamp members 32 and 33 are swiveled upon the endless conveyor 19, laminated glass sandwiches of various curvatures can be supported thereby without imposing any strain thereupon which might tend to break the glass sheets. Likewise, the means for supporting the sandwiches offers substantially no interference to the prepressing operation. Although the method and apparatus herein provided are of particular utility in the initial or prepressing of bent or curved laminated safety glass sandwiches, they may be utilized in the prepressing of flat sheets of safety glass. Also, while the method and apparatus are especially adapted for use in the prepressing of the sandwiches, they may be employed for effecting the final compositing of the laminations.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The process of producing laminated safety glass, which comprises assembling a plurality of laminations to form a sandwich, subjecting said sandwich to jets of fluid under pressure directed upon opposite sides thereof with sufficient force to effect a preliminary pressing of said sandwich to cause the laminations to adhere to one another throughout substantially their entire areas, and then subjecting the sandwich to a final pressure treatment.

2. The process of producing laminated safety glass, which comprises assembling a plurality of laminations to form a sandwich, subjecting opposite surfaces of said sandwich simultaneously to high velocity pressure jets of a heated fluid under sufficient force to effect a preliminary pressing of said sandwich to cause the laminations to adhere to one another throughout substantially their entire areas, and then subjecting said sandwich to a final pressure treatment.

3. The process of producing laminated safety glass, which comprises assembling a plurality of laminations to form a sandwich, supporting said sandwich on edge in a substantially vertical position and passing the same in a generally horizontal direction, directing upon opposite sides of said sandwich during forward movement thereof high velocity jets of a low melting point alloy with sufficient force to effect a preliminary pressing of said sandwich to cause the laminations to adhere to one another throughout substantially their entire areas, and then subjecting said sandwich to a final pressure treatment.

4. The process of producing laminated safety glass, which comprises assembling a plurality of laminations to form a sandwich, preheating said sandwich, then subjecting said sandwich to a preliminary pressure treatment by directing jets of fluid under pressure against opposite sides thereof with sufficient force to cause the laminations to adhere to one another throughout substantially their entire areas, and then subjecting said sandwich to a final pressure treatment.

5. The process of producing laminated safety glass, which comprises assembling a plurality of laminations to form a sandwich, preheating said sandwich, then subjecting said sandwich to a preliminary pressure treatment by directing high velocity pressure jets of a heated fluid upon opposite sides thereof with sufficient force to cause the laminations to adhere to one another throughout substantially their entire areas, and then subjecting said sandwich to a final pressure treatment.

6. The process of producing laminated safety glass, which comprises assembling a plurality of laminations to form a sandwich, supporting said sandwich on edge in a substantially vertical position and passing the same in a generally horizontal direction, preheating said sandwich, then subjecting said sandwich to a preliminary pressure treatment during the forward travel thereof by directing high velocity jets of a low melting point alloy upon opposite sides of said sandwich with sufficient force to cause the laminations to adhere to one another throughout substantially their entire areas, and then subjecting said sandwich to a final pressure treatment.

7. The process of producing laminated safety glass, which comprises assembling a plurality of laminations to form a sandwich, subjecting said sandwich to jets of fluid under pressure directed upon opposite sides thereof with sufficient force to effect a preliminary pressing of said sandwich to cause the laminations to adhere to one another throughout substantially their entire areas, then subjecting said sandwich to a relatively higher temperature to remove any of the fluid adhering to the glass surfaces, and then subjecting said sandwich to a final pressure treatment.

8. The process of producing laminated safety glass, which comprises assembling a plurality of laminations to form a sandwich, supporting said sandwich on edge in a substantially vertical position and passing the same in a generally horizontal direction, directing upon opposite sides of said sandwich during forward movement thereof high velocity jets of a low melting point alloy with sufficient force to effect a preliminary pressing of said sandwich to cause the laminations to adhere to one another throughout substantially their entire areas, then subjecting said sandwich to a relatively higher temperature to remove any alloy adhering to the glass surfaces, and then subjecting said sandwich to a final pressure treatment.

9. The process of producing laminated safety glass, which comprises assembling a plurality of laminations to form a sandwich, preheating said sandwich, then subjecting said sandwich to a preliminary pressure treatment by directing jets of fluid under pressure against opposite sides thereof with sufficient force to cause the laminations to adhere to one another throughout substantially their entire areas, then subjecting said sandwich to a relatively higher temperature to remove any of the fluid adhering to the glass surfaces, and then subjecting said sandwich to a final pressure treatment.

10. The process of producing laminated safety glass, which comprises assembling a plurality of laminations to form a sandwich, supporting said sandwich on edge in a substantially vertical position and passing the same in a generally horizontal direction, preheating said sandwich, then subjecting said sandwich to a preliminary pressure treatment during the forward travel thereof by directing high velocity jets of a low melting point alloy upon opposite sides of said sandwich with sufficient force to cause the laminations to adhere to one another throughout substantially their entire areas, then subjecting said sandwich to a relatively higher temperature to remove any alloy adhering to the glass surfaces, and then subjecting said sandwich to a final pressure treatment.

11. The process of producing laminated safety glass, which comprises assembling a plurality of laminations to form a sandwich, and subjecting said sandwich to jets of fluid under pressure directed upon opposite sides thereof with sufficient force to cause the laminations to adhere to one another throughout substantially their entire areas.

12. The process of producing laminated safety glass, which comprises assembling a plurality of laminations to form a sandwich, and subjecting opposite surfaces of said sandwich simultaneously to high velocity jets of a heated fluid under sufficient force to cause the laminations to adhere to one another throughout substantially their entire areas.

13. The process of producing laminated safety glass, which comprises assembling a plurality of laminations to form a sandwich, and directing upon opposite sides of said sandwich high velocity jets of a low melting point alloy with sufficient force to cause the laminations to adhere to one another throughout substantially their entire areas.

14. The process of producing laminated safety glass, which comprises assembling a plurality of laminations to form a sandwich, and subjecting said sandwich to jets of fluid under pressure directed upon opposite sides of the sandwich beginning at a point adjacent one edge thereof and spreading progressively over the entire area with sufficient force to cause the laminations to adhere to one another.

15. The process of producing laminated safety glass, which comprises assembling a plurality of laminations to form a sandwich, and subjecting said sandwich to high velocity jets of a low melting point alloy directed upon opposite sides of the sandwich beginning at a point adjacent one edge thereof and spreading progressively over the entire area with sufficient force to cause the laminations to adhere to one another.

ORMOND H. PADDOCK.